Nov. 17, 1925.
F. E. BASH
1,561,583
OPTICAL PYROMETER
Filed Dec. 13, 1923
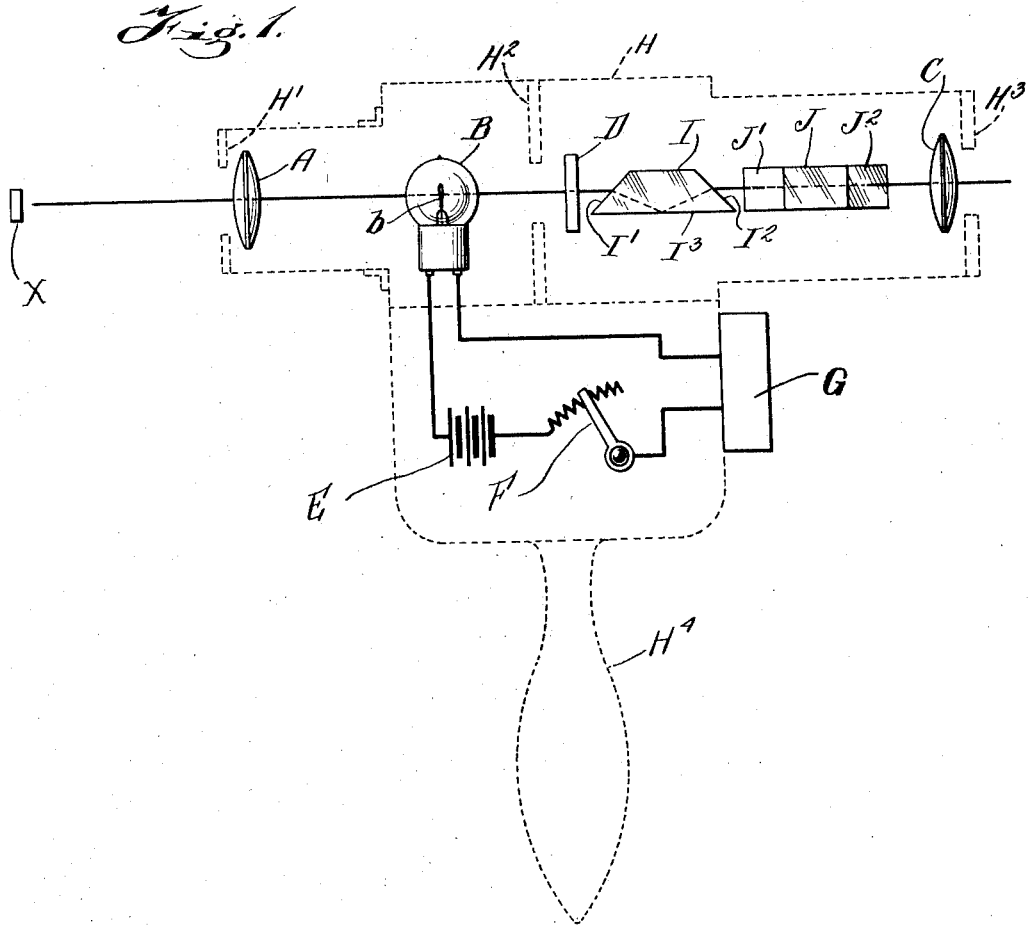
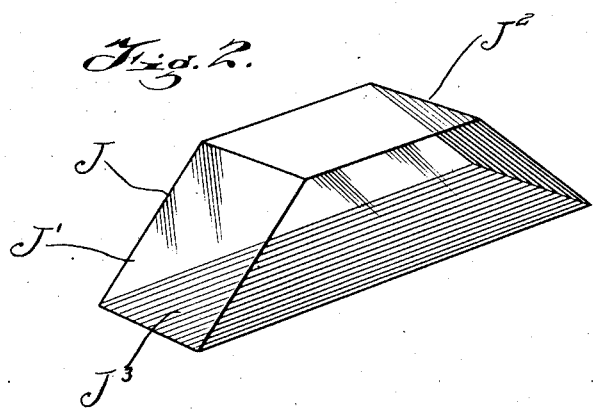
INVENTOR
Francis E. Bash
BY
John E. Hubbell
ATTORNEY Patented Nov. 17, 1925.

1,561,583

UNITED STATES PATENT OFFICE.

FRANCIS EDWIN BASH, OF MORRISTOWN, NEW JERSEY, ASSIGNOR TO BROWN INSTRUMENT COMPANY, OF PHILADELPHIA, PENNSYLVANIA, A CORPORATION OF PENNSYLVANIA.

OPTICAL PYROMETER.

Application filed December 13, 1923. Serial No. 680,383.

*To all whom it may concern:*

Be it known that I, FRANCIS E. BASH, a citizen of the United States, and resident of Morristown, in the county or Morris and State of New Jersey, have invented certain new and useful Improvements in Optical Pyrometers, of which the following is a specification.

My present invention consists in an improvement in optical pyrometers devised for the purpose of enabling the user of such a pyrometer to more readily locate, and focus the instrument on the hot object, or portion of the hot object, the temperature of which is to be measured, and is particularly useful in measuring the temperature of a moving object such as an ingot suspended from a travelling crane or the like.

For a better understanding of the invention and its advantages, reference should be had to the accompanying drawings and descriptive matter in which I have illustrated and described a preferred embodiment of the invention.

Of the drawings:

Fig. 1 is a somewhat diagrammatic elevation of a pyrometer constructed in accordance with the present invention; Fig. 2 is a perspective view of a prism employed in the pyrometer shown in Fig. 1.

In the pyrometer shown in the drawings, A represents the object lens which in the use of the pyrometer, forms a real image of the hot object X in the plane of the filament $b$ of the electric pyrometer lamp B. C represents the ocular lens or eye glass through which the lamp filament $b$ and the real image of the object X are compared. D represents a red glass filter interposed between the ocular lens C and the filament $b$. E represents a source of electric current for energizing the lamp B, and F is a rheostat for regulating the intensity of the current supplied to the lamp. G is an ammeter for measuring the current flow through the lamp and thereby the temperature of the lamp filament. The lenses A and C, lamp B, and filter D, are all mounted in a suitable casing or housing H shown in dotted outline which may or may not also form a support for the current source E, rheostat F, and meter G. The casing H is formed with a handle $H^4$ by which it may be held and moved by the user, and comprises apertured discs $H'$, $H^2$, and $H^3$, for cutting off unnecessary light and insuring sharp images, and in practice comprises the usual provisions, not illustrated, for moving the lenses A and C toward and away from the lamp B in focusing the instrument.

In so far as above described, the pyrometer illustrated comprises nothing novel, but on the contrary is of a type well known and in common use. In the use of such a pyrometer a real image of the object X is formed by the lens A in the plane of the filament $b$, and that filament will appear dark, or light, or will practically disappear, accordingly as the temperature of the object is higher, or lower, or the same as the temperature of the filament; and the object temperature is measured by adjusting the rheostat F to make the lamp filament temperature the same as that of the object, and then reading the meter G which measures the intensity of the lamp energizing current and may be provided with a scale graduated not in electric current units, but in temperature units. The real image formed by the lens A in the plane of the filament $b$ is both inverted and perverted: that is, it is turned upside down, and is turned right for left and so appears to the eye of the observer who actually sees a virtual image of the real image. The fact that the image actually seen by the observer is a virtual image of a real inverted and perverted image is objectionable in the ordinary use of the pyrometer, as it impedes the location of the object or portion of the object on which the instrument is to be focused and this difficulty becomes especially serious, when, as frequently is the case it is desired to read the temperature of a moving object such as an ingot supported by a traveling crane. This difficulty is especially important because the ordinary user of optical pyrometer does not use the instrument often enough to make him instinctively realize that when the object under observation appears to be moving up or to the right, for instance, that the object is actually moving downward or to the left, and that the pyrometer must be moved accordingly to keep the object within the field of vision of the instrument.

This difficulty is avoided in accordance with the present invention by providing the lens system of the instrument with means for suitably reversing the image formed in the eye of the observer. The means employed for this purpose comprises a pair of erecting prisms I and J. The prisms I and J are shown as arranged between the lamp B and lens C. The prism I comprises a flat side $I^3$ parallel to the optical axis of the instrument, and end surfaces $I'$ and $I^2$ intersecting and oppositely inclined to said axis, so that a ray of light coming from the plane of the lamp filament and entering the prism through the end face $I'$ is deflected against the side face $I^3$ of the prism T and is thereby reflected, and passes out of the prism through the end face $I^2$ in a direction parallel to its original direction. The prism J may be and as shown is exactly similar to the prism I, comprising end surfaces $J'$ and $J^2$ and a reflecting side $J^3$ corresponding respectively to the surfaces $I'$, $I^2$, and $I^3$ of the prism I, but the plane of the reflecting side $J^3$ of the prism J is at right angles to the plane of the corresponding plane $I^3$ of the prism I. With the prisms I and J included in the optical system of the pyrometer illustrated, the object X will appear to the eye of the observer to have its parts relatively positioned and to move, as those parts are actually positioned and as the object does move.

Having now described my said invention, what I claim as new and desire to secure by Letters Patent, is—

1. In an optical pyrometer comprising a lamp of regulable intensity, an object lens for forming a real image of an object under observation in the plane of the lamp, and an ocular lens through which said image and the lamp are visible, the improvement which consists in optical means cooperating with the said lenses to make the object appear to the observer with its parts in the non-inverted positions.

2. In an optical pyrometer comprising a lamp of regulable intensity, an object lens for forming a real image of an object under observation in the plane of the lamp, and an ocular lens through which said image and the lamp are visible, the improvement which consists in a pair of erecting prisms arranged between said lenses with their reflecting surfaces in planes at right angles to one another so as to make said object appear to the observer with its parts in non-inverted positions.

Signed at Morristown, in the county of Morris and State of New Jersey this 1st day of December, A. D. 1923

FRANCIS EDWIN BASH.